Jan. 5, 1960 G. E. SCHWARZ 2,919,926
OVER-WHEEL STABILIZERS FOR VEHICLES
Filed May 29, 1958 2 Sheets-Sheet 2
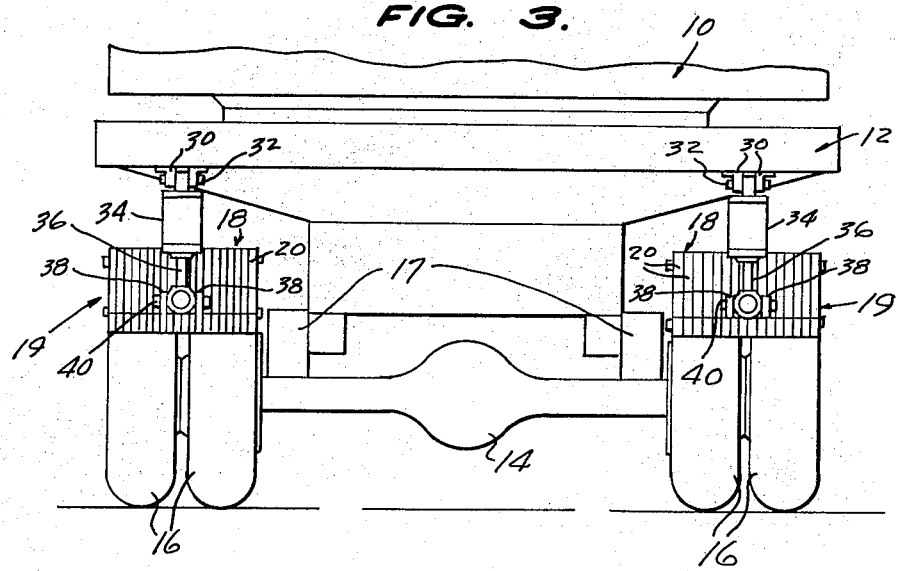
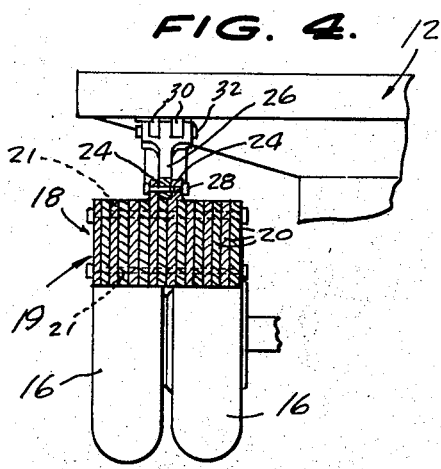
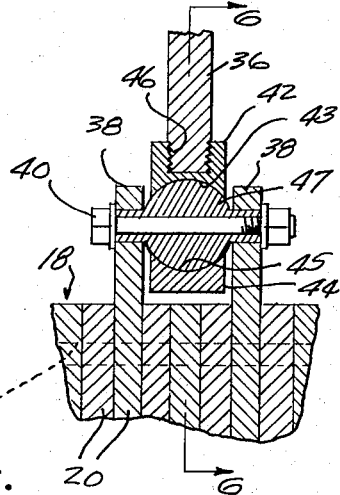
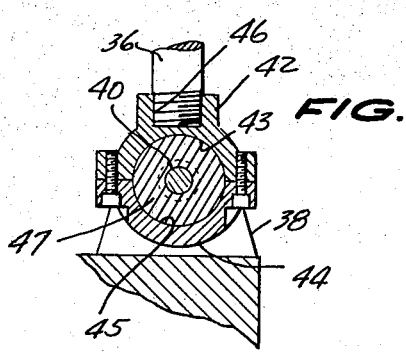
INVENTOR.
GEORGE E. SCHWARZ,
BY
McMorrow, Berman & Davidson
ATTORNEYS United States Patent Office 2,919,926
Patented Jan. 5, 1960

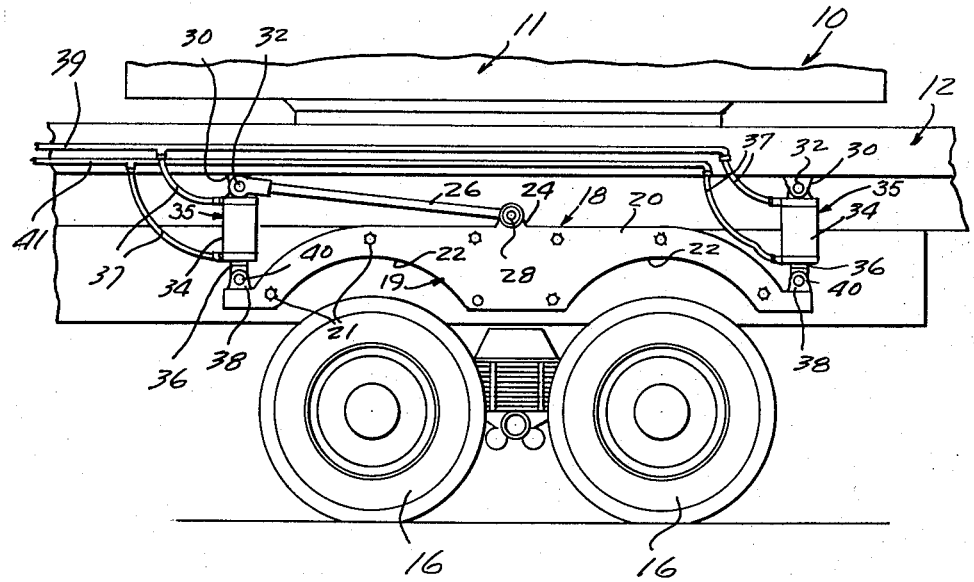
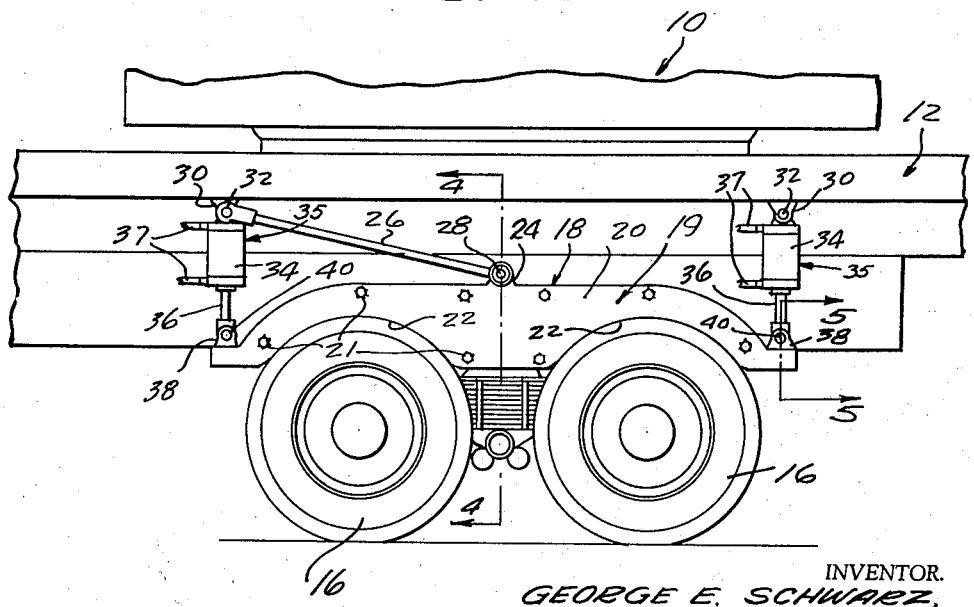

2,919,926

OVER-WHEEL STABILIZERS FOR VEHICLES

George E. Schwarz, Sandpoint, Idaho

Application May 29, 1958, Serial No. 738,738

5 Claims. (Cl. 280—6)

This invention relates to vehicle construction, and in particular relates to an over-wheel stabilizer, designed for mounting over the wheels of heavy vehicles such as truck-mounted power shovels, cranes, wheel-mounted rock crushers, etc.

Vehicles of the character described have a wheel suspension, which is comparatively narrow in respect to the overall width of the vehicle. In such cases the vehicle, when used during the discharge of its normal function, is often required to lift heavy loads, said loads being spaced laterally from the vehicle. The entire portion of the vehicle that is supported upon the wheel suspension has a tendency toward lateral tilting to a certain degree, and the axles and bearings of the wheel suspensions are subjected to very heavy pressures. As will be appreciated, this shortens the life of these components and in addition tends to produce breakdowns, as a result of which the equipment is out of service while repairs are being made.

The main object of the present invention is to provide an over-wheel stabilizer, which normally is elevated out of contact with the wheels of the vehicle so as to be inoperative during normal forward or rearward movement of the vehicle upon said wheels. The invention, in this regard, is so designed as to be lowered, through the means of a hydraulically powered linkage or through some similar arrangement, into engagement with the top surfaces of the wheels. In these circumstances, the device constituting the present invention extends as a more or less rigid spacer means between the top surfaces of the wheels and the underside of the vehicle body or frame immediately above the wheels. Lateral tilting of the vehicle is thus effectively precluded, and the heavy load now imposed on the axles and bearings is no longer borne wholly by these vehicle components.

Instead, by reason of the invention, the load is lifted partially from the ordinary wheel suspension, thus relieving excessive loading pressures on narrow, between-wheel suspensions, and creating a wider, initial base for normal operation of the vehicle.

It is proposed, in carrying out the invention, to provide an over-wheel stabilizer of the character described that will supplement any wheel suspensions presently in use. In this way, the device can be adapted as an attachment to machines that are already in use, without requiring modification or redesign of the basic construction of said machine.

While heretofore it has been proposed to provide supports, when a vehicle of the type stated is stopped and is used for its intended purposes, which supports have included hydraulic rams extending directly to the terrain, these have not been satisfactory in every instance, and it is therefore proposed in carrying out the invention to provide a stabilizing means that will be mounted wholly upon the vehicle and will not have to extend into contact with the ground surface.

Another object is to provide a device of the character stated which, without deviating from the basic principles under which it operates, can be readily modified, with minimum expense, to fit any of various types, sizes, and makes of vehicles.

Other objects will appear from the following description, the claims appended thereto, and from the annexed drawing in which like reference characters designate like parts throughout the several views, and wherein:

Figure 1 is a fragmentary side elevational view of a vehicle equipped with an over-wheel stabilizer according to the present invention, the stabilizer being shown in its raised, inoperative position;

Figure 2 is a view similar to Figure 1 in which the stabilizer has been lowered to its operative position;

Figure 3 is a fragmentary rear elevational view of the device, as seen from the right of Figure 2;

Figure 4 is a vertical sectional view transversely through the device, substantially on line 4—4 of Figure 2;

Figure 5 is an enlarged, detail sectional view on line 5—5 of Figure 2, showing one of the connections of a hydraulic ram to the support beam of the device; and Figure 6 is a detail sectional view on the same scale as Figure 5, taken substantially on line 6—6 of Figure 5.

Referring to the drawing in detail, designated generally at 10 is a vehicle equipped with a stabilizer according to the present invention.

In the illustrated example, a fragmentary portion of a truck-mounted shovel is shown, the shovel being generally designated at 11 and being mounted upon a turntable that is mounted upon the truck bed 12. The axle housing (see Figure 3) has been generally designated 14. The axle housing, at its opposite ends, carries the wheels 16.

In the illustrated arrangement, there are two axle housings, each of which carries a set of double wheels at each of its ends, the sets of wheels being in tandem arrangement at each side of the vehicle as shown in Figure 1. This is a typical, conventional arrangement in vehicles of this type.

The wheel suspension shown at 17 in Figure 3 is of comparatively narrow width in relation to the overall width of the truck bed, as will be clearly seen from Figure 3. Heretofore, the points at which the wheel suspension extends between the vehicle frame and the axle housings 14 have been the points where the main load has been borne, during use of the equipment for its intended purpose. In other words, with the equipment stopped and in use, the points designated at 17 in Figure 3 comprise the bearing points of the load. Such equipment generally has a large boom that extends laterally outwardly in many instances from the truck bed, with heavy loads being supported from the outer end of the boom. Obviously, the entire frame of the truck tends to tilt laterally upon the wheel suspension, causing heavy pressures to come to bear at one or the other of the locations at which the wheel suspensions 17 are connected to the axle housings.

The present invention aims to widen to a substantial degree the base of operation. As a result, in effect the width of the wheel suspension, so far as the bearing points are concerned, is widened. Part of the load, thus, is lifted from the conventional wheel suspension and is borne at the locations of the wheels 16.

The device comprising the present invention has been designated 18. As will be noted from Figure 3, two identical stabilizer structures 18 would be used on the vehicle, these being mounted at opposite sides of the vehicle above the wheels 16. Since both of these would be of identical construction, and would be linked for conjoint operation in a typical working arrangement, the description of one will suffice for both.

The stabilizer 18 includes an elongated support beam generally designated 19 which extends in a fore-and-aft direction along the side of the vehicle. Support beam 19 extends over the front and rear sets of the wheels 16 of the illustrated tandem wheel arrangement. The support beam 19 is of substantial width, the width being sufficient to correspond to the overall width of the wheels 16 of each set (see Figures 3 and 4). If, instead of double wheels 16, there is only a single wheel, then of course the device could be mounted correspondingly so as to be substantially of the same width as the width of said single wheel.

In any event, in the illustrated example the support beam 19 is formed of a plurality of side-by-side plates 20 disposed in face-to-face contact. The support beam is thus a laminated structure, having substantial strength in a vertical direction, due to the provision of vertically arranged plates, fixedly connected by any suitable means in side-by-side relation.

The plates, for example, could be bolted together at several locations, by means of transversely extending connecting bolts 21. It is understood that the number and locations of the bolts 21 could be varied, and said bolts are illustrated merely to show the fact that the plates 20 are fixedly connected. Other types of connections could of course be employed, so long as the same end result is obtained.

Designated at 22 are downwardly opening, arcuate recesses spaced longitudinally of the beam 19, and formed in the underside thereof through the provision of transversely aligned recesses of the plates 20. The recesses 22 are curved on a radius such that when the beam 19 is lowered into engagement with the top surfaces of the wheels 16, said recesses will have their walls in contact with the top surfaces of the wheels for the full length of the recesses. This is shown to particular advantage in Figure 2.

Designated at 24 are ears that project upwardly from two of the plates 20, said ears 24 being disposed in closely spaced relation at opposite sides of and equidistant from the longitudinal center line of the beam 19 (see Figure 4).

The ears 24 are pivotally connected to the rear end of an inclined brace bar 26, through the provision of a transversely extending connecting pin 28. This extends through aligned openings of the brace bar and ears 24, with the brace bar being disposed between the ears.

At this point, it will be understood that a universal connection, such as shown for example in Figures 5 and 6, could be employed to advantage in the connection between the brace bar 26 and the ears 24. This characteristic of the invention will be described in more detail hereinafter.

Designated at 30 are front and rear sets of depending ears or connecting brackets, fixedly secured to the underside of the truck bed 12, adjacent the opposite sides of said truck bed. In other words, at each side of the truck bed, there is a front set of two transversely spaced brackets 30 and a rear set thereof. Pivot pins 32 extend through the brackets of each set, and the front pivot pin pivotally connects the front end of bar 26 to the brackets of the forward set.

Designated at 34 are hydraulic cylinders, pivotally connected to and extending downwardly from the front and rear brackets. Axially shiftable within the cylinders 34 are rams 36. Each cylinder 34 and its ram 36 constitutes a hanger generally designated 35. Hydraulic fluid lines 37 extend from the opposite ends of each cylinder (see Figure 1), the upper lines 37 being connected to a hydraulic fluid line 39 and the lower lines 37 of the cylinders being connected to a second hydraulic fluid line 41.

In any event, it will be seen that by supplying pressure to one or the other end of the respective cylinders, the rams can be retracted or extended, as desired, from a remote location under the control of a machine operator.

Rams 36, at their lower ends, are provided with universal connections to upstanding brackets 38 rigid with the ends of the support beam 19. Said universal connections include transverse pins 40 (Figures 5 and 6) extending through bushings of the respective brackets 38.

Between the brackets 38 there is provided a ball socket comprising an upper socket section 42 having a hemispherical recess 43. The ball socket further includes a lower section 44 having an upwardly opening, hemispherical recess 45. Recesses 43, 45 cooperate to define a spherically shaped cavity receiving a ball 47 having a transverse passage through which the pin 40 rotatably extends.

This provides a universal connection, as will be understood, between each ram and the associated end of the support beam.

The upper sections 42 have upwardly opening, threaded recesses 46 receiving the threaded lower ends of the rams 36.

Universal connections such as shown in Figures 5 and 6 could be provided at some locations other than where the rams 36 are connected to the ends of the support beam 19. They could be provided, for instance, where the bar 26 is connected to the ears 24. They could also be provided where the bar 26 is connected, at its front end, to the forward set of brackets 30. However, conventional clevis-type connections, such as have been illustrated, would undoubtedly be suitable where the cylinders 34 are connected at their upper ends to the adjacent brackets 30.

In use of the device, normally the support beams would be raised responsive to retraction of the rams 36 into the cylinders 34. This is shown in Figure 1, and the position of the support beams in this figure is that which would be employed while the vehicle is in movement from place to place. In other words, the support beams would be raised while the vehicle is traveling on the highway, to or from a particular job.

If, however, it is desired to use the stabilizer during the actual performance of the work, at this time of course the vehicle would be stopped. With the vehicle wheels stationary, hydraulic pressure is applied through the appropriate pressure line, that is, the line 39, and this extends the rams 36. The result will be that the support beam will be lowered into engagement with the top surfaces of the wheels 15 as in Figure 2. Pressure is maintained within the rams, of course, so that the stabilizer extends as a spacer between the side of the truck bed and the wheels 16. Said spacer of course has whatever vertical dimension that is needed to insure that the support beam is retained in contact with the top surfaces of the wheels. Said vertical dimension would vary, of course, in different situations, that is, the vertical dimension of the device when in use would depend upon the distance between the truck bed and the wheels of the vehicle. One merely extends the rams until the support beam comes into contact with the top surfaces of the wheels. The stabilizers at both sides of the vehicle would be linked for conjoint operation.

It will be readily observed that this will increase the effective width of the load-bearing structure, so that instead of the locations 17 being the main bearing points, a substantial part of the pressure is received at the sides of the vehicle, through the provision of stabilizers that extend as rigid spacers, so to speak, between the underside of the truck bed and the wheels 16 at locations outwardly from the wheel suspension 17.

This construction provides very desirable characteristics, which are not found in a vehicle of this type. Heavy loads can be taken by the power shovel, crane, or other heavy equipment, with said heavy loads being carried well outwardly, laterally from the vehicle. Normally, said loads tilt the body of the equipment upon the wheel suspension, but the present invention provides a wider support base for the equipment, so that the main pressure is not carried by the wheel suspension. This in turn adds life to the axles, as well as to adjacent components of the wheel suspension.

It is believed apparent that the invention is not necessarily confined to the specific use or uses thereof described above since it may be utilized for any purpose to which it may be suited. Nor is the invention limited to the specific construction illustrated and described, since such construction is only intended to be illustrative of the principles it being considered that the invention comprehends any minor change in construction that may be permitted within the scope of the appended claims.

What is claimed is:

1. An over-wheel stabilizer for a vehicle of the type including a frame, an axle housing, ground wheels on the ends of the housing, and a wheel suspension extending between the housing and frame inwardly from the wheels, said stabilizer comprising, for mounting above each wheel: a support beam overlying said wheel; and means for suspending said beam from the vehicle frame, said means being rigid at least in a vertical direction and being adapted for vertically moving the support beam out of and into engagement with the wheel underlying the same, said support beam having a downwardly opening, arcuate recess complementary to the top portion of the wheel and adapted to receive said top portion of the wheel on lowering of the support beam into engagement with the wheel, the support beam comprising a plurality of plates disposed in face-to-face contact in vertical planes, said plates being each formed with a downwardly opening recess aligned transversely of the support beam with corresponding recesses of the remaining plates, so as to define said first named recess of the support beam.

2. The combination, with a vehicle frame, axle housing, ground wheels on the end of the housing, and wheel suspension on which the frame is laterally tiltable and which extends between the housing and frame inwardly from the wheels, of an over-wheel stabilizer for mounting above each wheel, said stabilizer comprising: a support beam overlying said wheel and extending in a fore-and-aft direction along the frame; a plurality of hangers suspending said beam from the frame, said hangers being spaced longitudinally of the beam one in front of and another rearwardly of the wheel, said hangers being rigid at least in a vertical direction and being adapted for vertically moving the support beam out of and into engagement with the wheel underlying the same, the support beam having a downwardly opening, arcuate recess disposed between the hangers, said recess being complementary to the top portion of the wheel and being adapted to receive said top portion on lowering of the beam into engagement with the wheel, the respective hangers being connected to the beam at opposite ends of the beam; and a brace bar extending longitudinally of the beam and connected between the beam and said frame, to restrain the beam and the wheel engaged thereby against longitudinal displacement in respect to the frame.

3. The combination, with a vehicle frame, axle housing, ground wheels on the end of the housing, and wheel suspension on which the frame is laterally tiltable and which extends between the housing and frame inwardly from the wheels, of an over-wheel stabilizer for mounting above each wheel, said stabilizer comprising: a support beam overlying said wheel and extending in a fore-and-aft direction along the frame; a plurality of hangers suspending said beam from the frame, said hangers being spaced longitudinally of the beam one in front of and another rearwardly of the wheel, said hangers being rigid at least in a vertical direction and being adapted for vertically moving the support beam out of and into engagement with the wheel underlying the same, the support beam having a downwardly opening, arcuate recess disposed between the hangers, said recess benig complementary to the top potrion of the wheel and being adapted to receive said top portion on lowering of the beam into engagement with the wheel, the respective hangers being connected to the beam at opposite ends of the beam; and a brace bar extending longitudinally of the beam and connected between the beam and said frame, to restrain the beam and the wheel engaged thereby against longitudinal displacement in respect to the frame, the connections of the brace bar to the support beam and frame being of the pivotal type.

4. The combination, with a vehicle frame, axle housing, ground wheels on the end of the housing, and wheel suspension on which the frame is laterally tiltable and which extends between the housing and frame inwardly from the wheels, of an over-wheel stabilizer for mounting above each wheel, said stabilizer comprising: a support beam overlying said wheel and extending in a fore-and-aft direction along the frame; a plurality of hangers suspending said beam from the frame, said hangers being spaced longitudinally of the beam one in front of and another rearwardly of the wheel, said hangers being rigid at least in a vertical direction and being adapted for vertically moving the support beam out of and into engagement with the wheel underlying the same, the support beam having a downwardly opening, arcuate recess disposed between the hangers, said recess being complementary to the top portion of the wheel and being adapted to receive said top portion on lowering of the beam into engagement with the wheel, the respective hangers being connected to the beam at opposite ends of the beam; and a brace bar extending longitudinally of the beam and connected between the beam and said frame, to restrain the beam and the wheel engaged thereby against longitudinal displacement in respect to the frame, the connections of the brace bar to the support beam and frame being of the pivotal type, the connections of said hangers to the support beam and to said frame also being of the pivotal type.

5. The combination, with a vehicle frame, axle housing, ground wheels on the ends of the housing, and wheel suspension on which the frame is laterally tiltable and which extends between the housing and frame inwardly from the wheels, of an over-wheel stabilizer for mounting above each wheel, said stabilizer comprising: a support beam overlying each wheel and extending in a fore-and-aft direction along the frame; at least two hangers spaced longitudinally of the beam one in front of and the other rearwardly of the wheel, said hangers suspending the beam from the frame and being extensible in a generally vertical direction to raise and lower the beam out of and into engagement with the underlying wheel, said beam having a bottom recess receiving the wheel in the lowered position of the beam, each hanger being connected to the frame and beam for pivotal movement at least about axes extending transversely of the frame and beam respectively; and a brace bar extending longitudinally of the beam, said brace bar being pivotally connected at one end to the frame to swing about the axis of the connection of one of the hangers to the frame, and being pivotally connected at its other end to the beam intermediate the ends of the beam about an axis paralleling the first-named axis of the brace bar, thus to hold the beam and the wheel engaged thereby against longitudinal displacement in respect to the frame in the lowered position of the beam.

References Cited in the file of this patent

UNITED STATES PATENTS

| 31,583 | Derr | Feb. 26, 1861 |
| 1,307,422 | Scott | June 24, 1919 |
| 1,523,549 | Lott | Jan. 20, 1925 |
| 2,678,828 | Bell | May 18, 1954 |

FOREIGN PATENTS

| 1,061.792 | France | Dec. 2, 1953 |